United States Patent
Liu et al.

(10) Patent No.: US 12,482,075 B2
(45) Date of Patent: Nov. 25, 2025

(54) RESTORING IMAGES USING DECONVOLUTION

(71) Applicant: Samsung Electronics Co., Ltd., Suwon-si (KR)

(72) Inventors: Changgeng Liu, San Jose, CA (US); Luxi Zhao, Toronto (CA); Ziwen Jiang, Sunnyvale, CA (US); Abdelrahman Abdelhamed, Toronto (CA); Abhijith Punnappurath, North York (CA); Ye Zhao, Sunnyvale, CA (US); Ernest Rehmatulla Post, San Francisco, CA (US); Michael Brown, Toronto (CA); Sajid Sadi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 17/993,357

(22) Filed: Nov. 23, 2022

(65) Prior Publication Data
US 2024/0177278 A1    May 30, 2024

Related U.S. Application Data

(60) Provisional application No. 63/350,267, filed on Jun. 8, 2022.

(51) Int. Cl.
| | | |
|---|---|---|
| G06T 5/73 | (2024.01) | |
| G06T 5/50 | (2006.01) | |
| G06T 5/70 | (2024.01) | |

(52) U.S. Cl.
CPC ............. *G06T 5/73* (2024.01); *G06T 5/50* (2013.01); *G06T 5/70* (2024.01); *G06T 2207/20201* (2013.01)

(58) Field of Classification Search
CPC .... G06T 5/73; G06T 5/70; G06T 5/50; G06T 2207/20201
See application file for complete search history.

(56) References Cited

U.S. PATENT DOCUMENTS

| 3,971,065 A | 7/1976 | Bayer |
|---|---|---|
| 6,454,414 B1 | 9/2002 | Ting |

(Continued)

FOREIGN PATENT DOCUMENTS

| CN | 101414094 A | 4/2009 |
|---|---|---|
| CN | 107220945 A | 9/2017 |

(Continued)

OTHER PUBLICATIONS

PCT Search Report and Written Decision in PCT/KR2022/001920, May, 13, 2022.

(Continued)

*Primary Examiner* — Matthew C Bella
*Assistant Examiner* — Jinsu Hwang

(57) ABSTRACT

In one embodiment, a method includes generating, from an accessed image, one or more image patches, and for each image patch: (1) accessing a set of point-spread functions (PSFs), wherein each PSF in the set of PSFs corresponds to one of a plurality of points in the image patch; (2) generating a set of deconvolved image patches by deconvolving the image patch with each PSF from the set of PSFs for that patch; (3) determining, for each of one or more portions of the image patch, a set of weights, wherein each weight in the set of weights is associated with one of the deconvolved image patches; and (4) generating a restored image patch by interpolating the set of deconvolved image patches based on the set of weights.

20 Claims, 20 Drawing Sheets

(56) References Cited

U.S. PATENT DOCUMENTS

| | | |
|---|---|---|
| 7,053,613 B2 | 5/2006 | Lin |
| 8,041,142 B2 | 10/2011 | Schafer |
| 8,294,999 B2 | 10/2012 | Alon |
| 8,433,152 B2 | 4/2013 | Watanabe |
| 8,582,820 B2 | 11/2013 | Kane |
| 8,582,911 B2 | 11/2013 | Kim |
| 8,587,703 B2 | 11/2013 | Lelescu |
| 8,934,034 B2 | 1/2015 | Nayar |
| 9,063,344 B1 | 6/2015 | Griffin |
| 9,142,009 B2 | 9/2015 | Lin |
| 9,220,481 B2 | 12/2015 | Park |
| 9,338,354 B2 | 5/2016 | Hong |
| 9,350,977 B1 | 5/2016 | Prasad |
| 9,582,862 B2 | 2/2017 | Zhang |
| 9,654,707 B2 | 5/2017 | Oniki |
| 9,911,208 B2 | 3/2018 | Zhou |
| 9,916,656 B2 | 3/2018 | Choi |
| 9,947,901 B2 | 4/2018 | Shedletsky |
| 9,948,849 B2 | 4/2018 | Kim |
| 10,032,254 B2 | 7/2018 | Harmeling |
| 10,062,153 B2 | 8/2018 | Oniki |
| 10,083,335 B2 | 9/2018 | Zhang |
| 10,151,933 B2 | 12/2018 | Siddiqui |
| 10,178,381 B2 | 1/2019 | Hall |
| 10,191,577 B2 | 1/2019 | Choi |
| 10,217,190 B2 | 2/2019 | Liu |
| 10,416,087 B2 | 9/2019 | Zhang |
| 10,594,932 B2 | 3/2020 | Kim |
| 10,595,724 B2 | 3/2020 | Lai |
| 10,642,059 B2 | 5/2020 | Soskind |
| 10,656,437 B2 | 5/2020 | Limon |
| 11,003,088 B2 | 5/2021 | Sorg |
| 11,038,143 B2 | 6/2021 | Moon |
| 11,073,712 B2 | 7/2021 | Yeke Yazdandoost |
| 11,272,106 B1 | 3/2022 | Lee |
| 11,368,617 B2 | 6/2022 | Zhou |
| 11,575,865 B2 | 2/2023 | Liu |
| 11,721,001 B2 | 8/2023 | Liu |
| 11,792,515 B2 | 10/2023 | Lee |
| 11,893,482 B2 | 2/2024 | Zhou |
| 12,069,381 B2 | 8/2024 | Xu |
| 2003/0002746 A1 | 1/2003 | Kusaka |
| 2006/0103951 A1 | 5/2006 | Bell |
| 2006/0256226 A1 | 11/2006 | Alon |
| 2007/0239417 A1 | 10/2007 | Alon |
| 2008/0013850 A1 | 1/2008 | Sakurai |
| 2008/0068660 A1 | 3/2008 | Loce |
| 2008/0165261 A1 | 7/2008 | Kamo |
| 2008/0166115 A1 | 7/2008 | Sachs |
| 2008/0218597 A1 | 9/2008 | Cho |
| 2008/0292135 A1 | 11/2008 | Schafer |
| 2009/0147111 A1 | 6/2009 | Litvinov |
| 2009/0263043 A1 | 10/2009 | Cristobal |
| 2010/0073518 A1 | 3/2010 | Yeh |
| 2010/0188528 A1 | 7/2010 | Iwata |
| 2011/0019056 A1 | 1/2011 | Hirsch |
| 2011/0075257 A1 | 3/2011 | Hua |
| 2011/0158541 A1 | 6/2011 | Watanabe |
| 2011/0221888 A1 | 9/2011 | Choi |
| 2011/0285680 A1 | 11/2011 | Nakamura |
| 2012/0057072 A1 | 3/2012 | Yamashita |
| 2012/0162490 A1 | 6/2012 | Chung |
| 2012/0327277 A1 | 12/2012 | Myhrvold |
| 2013/0002932 A1 | 1/2013 | Guenter |
| 2013/0010077 A1 | 1/2013 | Nguyen |
| 2013/0147778 A1 | 6/2013 | Ninan |
| 2013/0170765 A1 | 7/2013 | Santos |
| 2013/0182062 A1 | 7/2013 | Son |
| 2013/0308007 A1 | 11/2013 | Tanaka |
| 2013/0321686 A1 | 12/2013 | Tan |
| 2013/0336597 A1 | 12/2013 | Maeda |
| 2014/0044314 A1 | 2/2014 | Sezer |
| 2015/0049165 A1 | 2/2015 | Choi |
| 2015/0101411 A1 | 4/2015 | Zalev |
| 2015/0207962 A1 | 7/2015 | Sugimoto |
| 2015/0269434 A1 | 9/2015 | Aliaga |
| 2015/0338639 A1 | 11/2015 | Mtsumoto |
| 2016/0062100 A1 | 3/2016 | Cohen |
| 2016/0110851 A1 | 4/2016 | Oniki |
| 2016/0180510 A1 | 6/2016 | Grau |
| 2016/0248975 A1 | 8/2016 | Choi |
| 2016/0277658 A1* | 9/2016 | Kim ................. H04N 25/704 |
| 2016/0371821 A1 | 12/2016 | Hayashi |
| 2017/0076430 A1 | 3/2017 | Xu |
| 2017/0104897 A1 | 4/2017 | Kang |
| 2017/0212613 A1 | 7/2017 | Hwang |
| 2017/0316552 A1 | 11/2017 | Hanocka |
| 2018/0038768 A1 | 2/2018 | Hofmann |
| 2018/0052050 A1 | 2/2018 | Menon |
| 2018/0116500 A1 | 5/2018 | Escalier |
| 2018/0129061 A1 | 5/2018 | Shinohara |
| 2018/0198980 A1 | 7/2018 | Takagi |
| 2018/0211420 A1 | 7/2018 | Yoo |
| 2019/0212544 A1 | 7/2019 | Heber |
| 2019/0213717 A1 | 7/2019 | Oniki |
| 2019/0327417 A1 | 10/2019 | Moriuchi |
| 2019/0355101 A1 | 11/2019 | Chen |
| 2020/0159102 A1 | 5/2020 | Kouyama |
| 2020/0166807 A1 | 5/2020 | Sasaki |
| 2020/0169725 A1 | 5/2020 | Hua |
| 2020/0209604 A1 | 7/2020 | Chen |
| 2020/0321561 A1 | 10/2020 | Park |
| 2020/0389575 A1 | 12/2020 | Gove |
| 2020/0394964 A1 | 12/2020 | Hyun |
| 2021/0029336 A1* | 1/2021 | Liu ........................ G06T 5/73 |
| 2021/0136335 A1 | 5/2021 | Tanaka |
| 2021/0152735 A1 | 5/2021 | Zhou |
| 2021/0193756 A1 | 6/2021 | Oh |
| 2021/0199952 A1 | 7/2021 | Cho |
| 2021/0210533 A1 | 7/2021 | Cho |
| 2021/0233976 A1 | 7/2021 | Lee |
| 2021/0302316 A1 | 9/2021 | Walter |
| 2022/0060681 A1 | 2/2022 | Stec |
| 2022/0067889 A1 | 3/2022 | Kang |
| 2022/0086309 A1 | 3/2022 | Kim |
| 2022/0138924 A1 | 5/2022 | Kwon |
| 2022/0261966 A1 | 8/2022 | Liu |
| 2022/0277426 A1 | 9/2022 | Vyas |
| 2022/0292637 A1 | 9/2022 | Huang |
| 2022/0398698 A1 | 12/2022 | Li |
| 2022/0405892 A1 | 12/2022 | Kusumi |
| 2023/0053084 A1 | 2/2023 | Xu |
| 2023/0341264 A1 | 10/2023 | Houck |
| 2024/0013350 A1 | 1/2024 | Delbracio |
| 2024/0323548 A1 | 9/2024 | Sun |

FOREIGN PATENT DOCUMENTS

| | | |
|---|---|---|
| CN | 111 681 560 A | 9/2020 |
| CN | 112202991 A | 1/2021 |
| CN | 113 053 253 A | 6/2021 |
| CN | 113 067 961 A | 7/2021 |
| CN | 108335268 B | 9/2021 |
| CN | 114331886 A | 4/2022 |
| CN | 110675347 B | 5/2022 |
| JP | 2008-070566 A | 3/2008 |
| JP | 2019-068378 A | 4/2019 |
| JP | 6652052 B9 | 2/2020 |
| KR | 101894391 B1 | 9/2018 |
| KR | 10-2022-0014764 A | 2/2022 |
| WO | WO 2010081229 A1 | 7/2010 |
| WO | WO 2016-154392 A1 | 9/2016 |
| WO | WO 2017117152 A1 | 7/2017 |
| WO | WO 2021/122471 A1 | 6/2021 |
| WO | WO 2022-005157 A1 | 1/2022 |

OTHER PUBLICATIONS

Non-Final Office Action in U.S. Appl. No. 17/176,535, Aug. 16, 2022.
Final Office Action in U.S. Appl. No. 17/176,535, Nov. 7, 2022.
Notice of Allowance in U.S. Appl. No. 17/963,609, Aug. 28, 2024.

(56) References Cited

OTHER PUBLICATIONS

International Search Report and Written Opinion for International Application No. PCT/KR2023/017304, Feb. 2, 2024.
Yangjie Wei et al., Blurring kernel extraction and super-resolution image reconstruction based on style generative adersarial networks, Optics Express vol. 29, Issue 26, Dec. 16, 2021.
Eric Yang, Variable Synthetic Depth of Field with Mobile Stereo Cameras, Computer Science Engineering, https://stanford.edu/class/ee367/sections 3.2, 4.3; 2020, retrieved on Jan. 9, 2024.
Non-final Office Action in U.S. Appl. No. 17/963,609, Mar. 27, 2024.
Notice of Allowance in U.S. Appl. No. 17/176,535, Mar. 8, 2023.
PCT Search Report and Written Opinion in PCT/KR2022/015641, Jan. 26, 2023.
Soldevila F et al: "Phase imaging by spatial wavefront sampling", arxiv.org, Cornell University Library, 201 Olin Library Cornell University Ithaca, NY 14853, Nov. 11, 2017 (Nov. 11, 2017), XP081287443, DOI: 10.1364/OPTICA.5.000164.
Katkovnik Vladimir et al: "A novel binary and multilevel phase masks for enhanced depth-of-focus infrared imaging", 2018 52nd Asilomar Conference on Signals, Systems, and Computers, IEEE, Oct. 28, 2018 (Oct. 28, 2018), pp. 386-390, XP033520926, DOI: 10.1109/ACSSC.2018.8645129.
European Patent Office Extended European Search Report in Application No. 22881419.0-1207/4327058 PCT/KR2022015641.
Yang, Hang, Zhongbo Zhang, and Yujing Guan. "An adaptive parameter estimation for guided filter based image deconvolution." *Signal Processing* 138 (2017): 16-26, Mar. 7, 2017.
Youmaran, R., and A. Adler. "Combining regularization frameworks for image deblurring: optimization of combined hyper-parameters." In *Canadian Conference on Electrical and Computer Engineering 2004* (IEEE Cat. No. 04CH37513), vol. 2, pp. 723-726. IEEE, 2004, May 2, 2004.
Non-Final Office Action in U.S. Appl. No. 17/380,995, Jun. 22, 2022.
PCT Search Report and written decision in PCT/KR2022/001024, May 10, 2022.
Anqi Yang et al., 'Designing Display Pixel Layouts for Under-Panel Cameras', IEEE Transactions on Pattern Analysis and Machine Intelligence, vol. 43, No. 7, pp. 2245-2256, Apr. 27, 2021.
PCT Search Report and Written Decision in PCT/KR2022/011598, Nov. 16, 2022.
Levin, A. et al., "Image and Depth from a Conventional Camera with a Coded Aperture," ACM Transactions on Graphics, vol. 26, No. 3, Article 70, Publication date Jul. 2007, DOI 10.1145/1239451.123952, http://doi.acm.org/10.1145/1239451.1239521, 9 pgs.
Hong, J., et al., "Three-dimensional display technologies of recent interest: principles, status, and issues [Invited]," (Doc. ID 152226), Applied Optics, vol. 50, No. 34, , Dec. 1, 2011, https://www.researchgate.net/publication/51919272, DOI: 10.1364/A0.50.000H87, 0003-6935/11/340H87, ® 2011 Optical Society of America, pp. H87-H115 (30 pages).
Ren, Ng, "Digital light field photography," PhD dissertation, Stanford University, Jul. 2006, 203 pgs.
Qin, Zong, et al., "See-Through Image Blurring of Transparent Organic Light-Emitting Diodes Display: Calculation Method Based on Diffraction and Analysis of Pixel Structures," Journal of Display Technology, vol. 12, No. 11, Nov. 2016, Digital Object Identifier 10.1109/JDT.2016.2594815, 1551-319X ®2016 IEEE, pp. 1242-1249 (9 pgs).
Richardson, William Hadley, "Bayesian-Based Iterative Method of Image Restoration," Journal of Optical Society of America, vol. 62, No. 1, Jan. 1972, pp. 55-59 (5 pgs).
Lucy, L. B., "An Iterative Technique for the Rectification of Observed Distributions," The Astronomical Journal, vol. 79, No. 6, Jun. 1974, ® American Astronomical Society, provided by the NASA Astrophysics Data System, pp. 745-754 (10 pgs).
Heide, Felix, et al., "ProxImaL: Efficient Image Optimization Using Proximal Algorithms," SIGGRAPH 16 Technical paper, Jul. 24-28, 2016, Anaheim, CA. SIGGRAPH '16 Technical Paper, Jul. 24-28, 2016, Anaheim, CA, ISBN: 978-1-4503-4279-7/16/07 DOI: http://dx.doi.org/10.1145/2897824.2925875, 15 pages.
Sitzmann, Vincent., et al., "End-to-End Optimization of Optics and Image Processing for Achromatic Extended Depth of Field and Super-Resolution Imaging," ® 2018 ACM 0730-0301/2018/8-ART114, https://doi.org/10.1145/3197517.3201333, ACM Transactions on Graphics vol. 37, No. 4, Article 114, Publication Aug. 2018, pp. 114:1-114:13 (13 pgs.).
International Search Report and Written Opinion for International Application No. PCT/KR2020/009807, Oct. 26, 2020.
European Search Report in EP 20846484.2, Mar. 14, 2022.
Non-Final Office Action in U.S. Appl. No. 16/935,946, Apr. 5, 2022.
Notice of Allowance in U.S. Appl. No. 16/935,946, Jul. 6, 2022.
Notice of Allowance in U.S. Appl. No. 16/935,946, Sep. 30, 2022.
Notice of Allowance in U.S. Appl. No. 17/380,995, Dec. 21, 2022.
Oppo's under-screen camera is real and taking photos in Shanghai accessed on Oct. 25, 2022 at https://www.engadget.com/2019-06-26-oppo-under-screen-camera-mwc-shanghai.html, Downloaded from web Oct. 25, 2022.
Image Restoration for Under-Display Camera, Yuqian Zhou et al., CVPR 2021, accessed on Oct. 25, 2022 at https://openaccess.thecvf.com/CVPR2021?day=all, Downloaded from web Oct. 25, 2022.
International Search Report and Written Opinion for International Application No. PCT/KR2023/007313, Aug. 30, 2023.
Extended European Search Report in Application No. 22853505.0-1211 / 4363929 PCT/KR2022011598, Dec. 18, 2024.
Lin Rong Jie et al.: "An Optimized Algorithm to Reconstruct the Structure of Transparent OLED Display Based on Monte Carlo Method", SID Symposium Digest/of Technical Papers, vol. 51, No. 1, Aug. 1, 2020, pp. 2009-2012, XP093230962, US ISSN:0097-966X, DOI: 10.1002/sdtp.14309.
Notice of Allowance in U.S. Appl. No. 17/745,693, Mar. 26, 2025.
Non-final office action in U.S. Appl. No. 17/993,483, Sep. 30, 2025.

\* cited by examiner

110

RESTORING IMAGES USING DECONVOLUTION

PRIORITY CLAIM

This application claims the benefit under 35 U.S.C. § 119 of U.S. Provisional Patent Application No. 63/350,267 filed 8 Jun. 2022, the entirety of which is incorporated herein by reference.

TECHNICAL FIELD

This application generally relates to restoring images using deconvolution.

BACKGROUND

Electronic devices, such as mobile phones, tablet computers, smartwatches, and so forth, often include one or more image sensors, such as a camera, that can capture images. For example, a personal electronic device may include one or more cameras on the rear, or back, of the device; may include one or more cameras on the front of the device; and may include one or more cameras oriented in other arrangements on the device.

An image taken by a camera, such as by a camera of an electronic device, may be degraded (or blurred) relative to the scene captured by the image due to a number of factors, such as interactions, obstructions, etc. that occur as light from the scene travels to the camera's sensor that captures the image. Degradation may be determined or represented by point-spread functions (PSFs) that describe the response of the camera's imaging system to various point sources, and a PSF may represent an amount of blurring that is present in an image of a point source. A PSF may be used to construct an un-degraded, or de-blurred, image via deconvolution.

DESCRIPTION OF EXAMPLE EMBODIMENTS

An optical system, such as a camera, typically includes several components. For example, a camera can include an aperture, which is an opening through which light from a scene is permitted to pass. After the aperture may be a lens, which focuses the light passing through the aperture onto a sensor. The sensor detects the focused light and outputs corresponding signals (e.g., electrical signals) that are used to create an image of the scene. The description above represents a simplified example of the components of a general optical system, and this disclosure recognizes that an optical system may include additional components or more than one of the components (e.g., lens or sensors) described above.

An image captured through a camera sensor is subject to blurring or degradation due to, e.g., corruption and noise, and the blurring function is often represented by one or more PSFs, which characterize the optical response of an optical system. For example, if a camera is disposed under a display of a device, then the display structure may interfere with the light from a scene as that light passes through the display, resulting in a blurred image output by the under-display camera's optical sensor.

Figure 1:
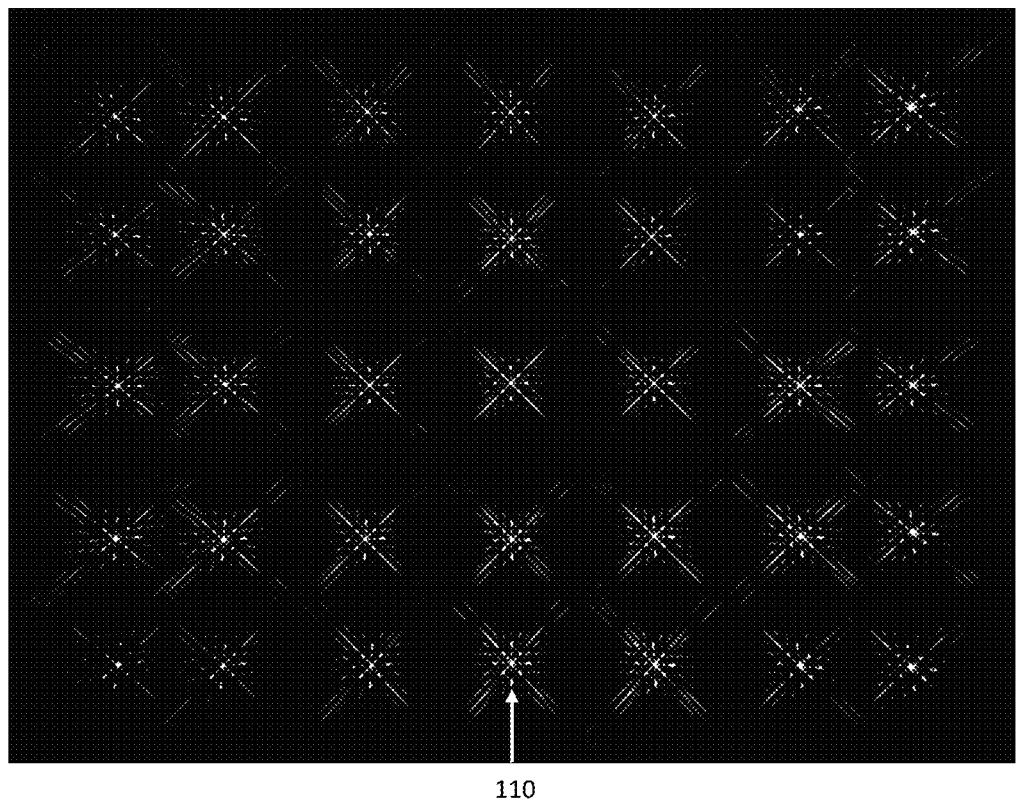
FIG. 1 illustrates an example set of PSFs at varying object positions for an optical system.

The PSF that characterizes the blurring in an image may vary as a function of the distance from the sensor. FIG. 1 illustrates an example set of PSFs at varying object positions for an optical system. In the example of FIG. 1, the plane of the image corresponds to a particular distance z from the camera, and the location of each PSF 110 corresponds to a particular x, y location within the plane. As illustrated in FIG. 1, the PSF of an optical system may vary with distance, for example because the optical interactions vary with the path of light travelling to a sensor, for example a sensor that is placed behind a display structure.

Figure 2:
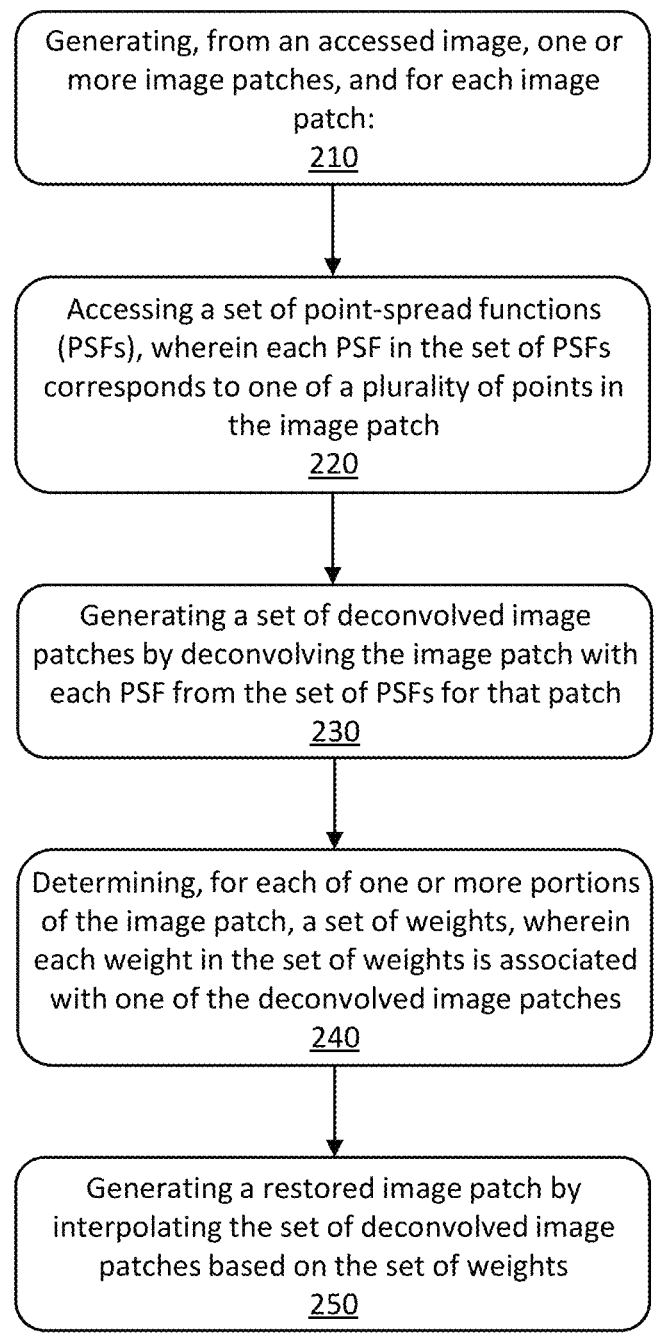
FIG. 2 illustrates an example method for deblurring an image by interpolating a set of point-spread functions.

FIG. 2 illustrates an example method of deblurring an image by interpolating a set of point-spread functions. Step 210 of the example method of FIG. 2 includes generating, from an accessed image, one or more image patches. In particular embodiments, accessing an image may include capturing an image, e.g., by the optical sensor of an optical system. In particular embodiments, step 210 may be performed on a computing device that includes the optical system. For example, a client device such as a smartphone, TV, laptop, etc. may include a camera and computing hardware and memory, and step 210, as well as the method of FIG. 2, may be performed by the computing device. In particular embodiment, step 210, as well as the method of FIG. 2, may be performed on a different computing device than the device that captured the image. For example, step 210 may be performed by a server computing device, or by a client computing device (e.g., a personal computer, etc.) to de-blur an image captured by another device (e.g., a camera or a smartphone, etc.). In particular embodiments different computing devices may perform different steps of the example method of Claim 1.

Figure 3:
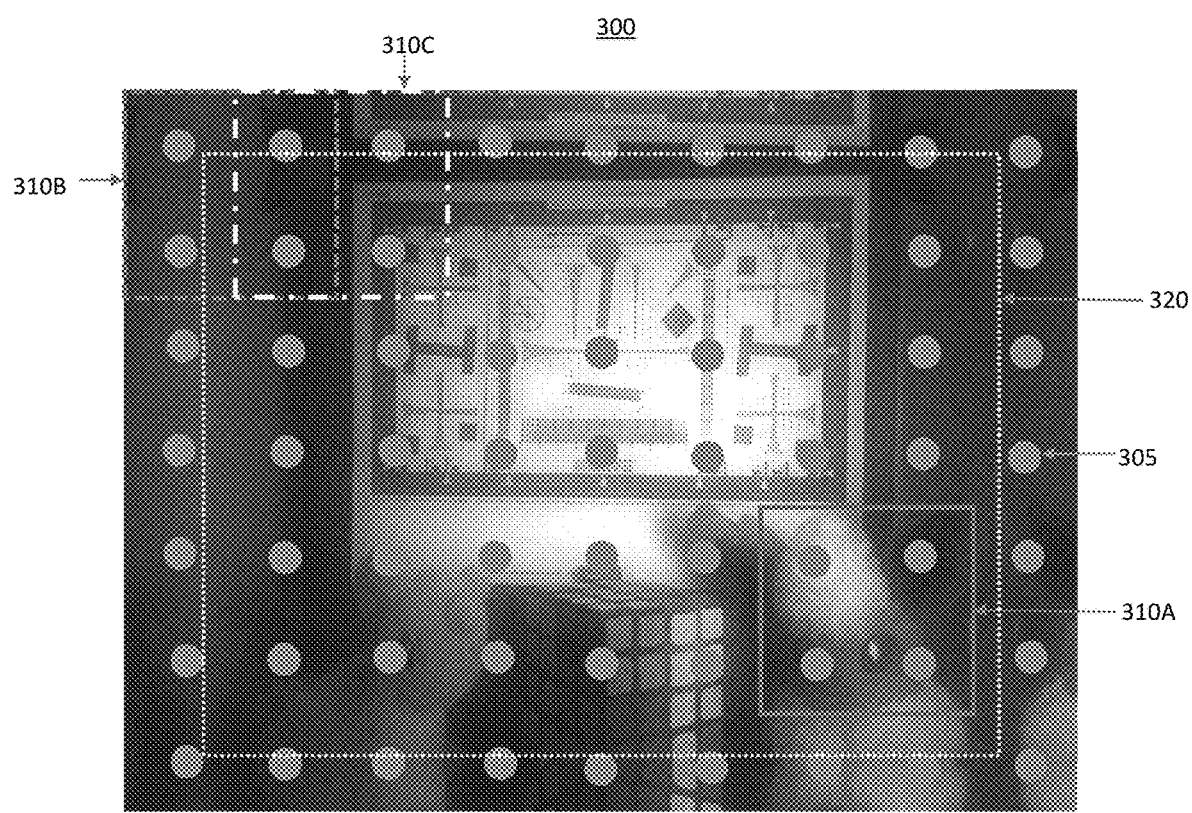
FIG. 3 illustrates an example of step 210 of the example method of FIG. 2.

FIG. 3 illustrates an example of step 210 of the example method of FIG. 2 (among other things). FIG. 3 illustrates image patches 310A, 310B, and 310C. In the example of FIG. 3, each PSF location 305 (illustrated by a dot) corresponds to a particular location of image 300 at which a corresponding PSF has been determined. As explained above, the PSF of an optical system may vary as a function of distance, and therefore several PSFs (each corresponding to a PSF location 305) may be used to deblur an image. While FIG. 3 illustrates a specific example of the number and location of PSFs for an image, this disclosure contemplates that any suitable number and location of PSFs may be used.

In the example of FIG. 3, an image patch is a square region, with each image patch containing the same number of PSFs (in this example, four). However, this disclosure contemplates that any suitable size or sizes and shape or shapes of image patches may be used, and that an image patch may contain any number of two or more PSFs. In the example of FIG. 3, the four PSFs in each image patch are symmetrically distributed within the patch. Moreover, in the example of FIG. 3, each patch overlaps with at least two other patches, as a patch is generated for each square set of four contiguous PSFs (thus, not every patch generated in the example of FIG. 3 is illustrated with a box in FIG. 3), and some patches overlap with four other patches. In particular embodiments, patches may be generated with less or no overlap, and/or some patches for an image may overlap and other patches for that image may not.

Figure 4:
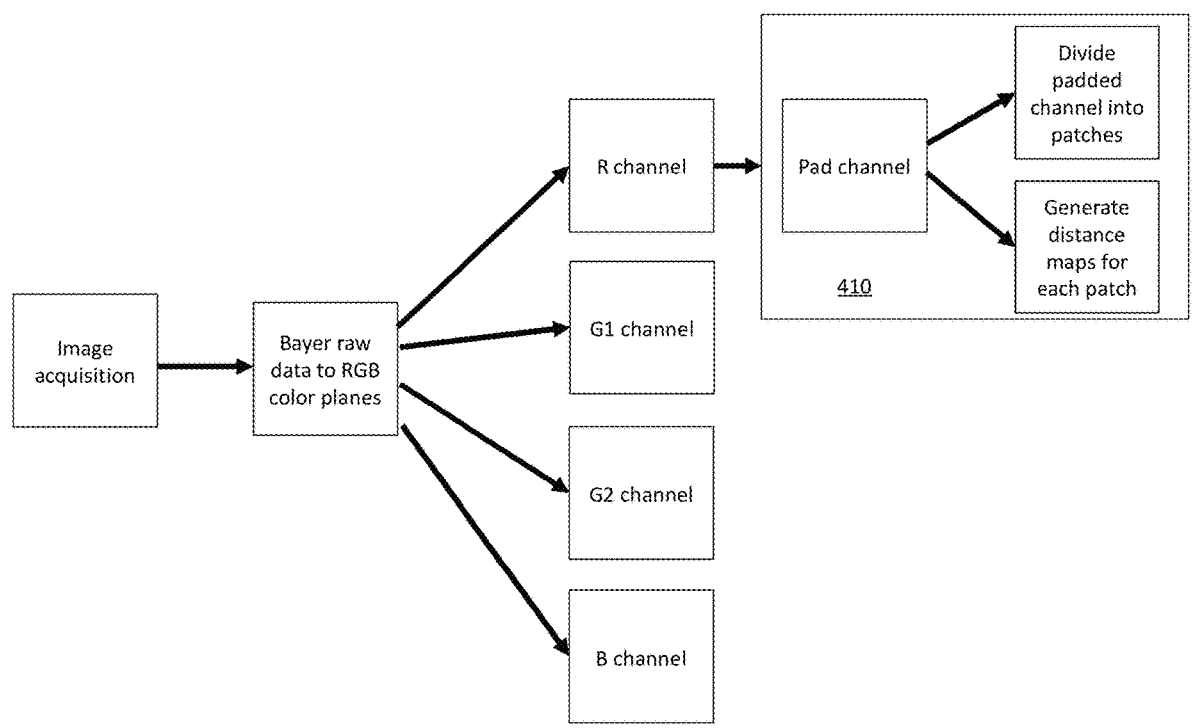
FIG. 4 illustrates an example approach for preprocessing an image.

In particular embodiments, before generating one or more image patches in step 210, a method of deblurring an image according to this disclosure may include certain preprocessing steps. FIG. 4 illustrates an example approach for pre-processing an image. In the example of FIG. 4, an image is accessed, and the raw Bayer data of the image sensor is separated into color planes. However, this disclosure contemplates that any suitable image-sensor technique may be used to detect an image. In the example of FIG. 4, the image data is divided into four channels: an R channel, a B channel, and two green channels (G1 and G2). In the example of FIG. 4, procedure 410 is performed on each of the four channels, but for convenience is illustrated after the R channel only. While the example of FIG. 4 illustrates four image channels corresponding to the image data, this disclosure contemplates that more or fewer image channels may be used, depending on the image sensing techniques used.

Procedure 410 of the example of FIG. 4 starts with padding the resulting, channelized image after the raw image data is separated into image channels. FIG. 3 illustrates an example of a greyscaled image channel. Padding the channel refers to extending the image corresponding to the channel. For example, portion 320 of FIG. 3 illustrates the actual sensed image corresponding to the R channel. The region outside of portion 320 represents an extension of portion 320, such that image 300 is an extended image (i.e., it includes both the original, captured image and the extended portion). In particular embodiments, image padding may be achieved by reflecting the image along its border. For example, in FIG. 3 the pixel values for the extended region of image 300 are obtained by reflecting the pixel values of the actual image about the border of the image. While padding may not be used in every embodiment of the systems and methods described in this disclosure, padding may be useful because pixels values corresponding to pixels outside the captured image region partially contribute to the value of pixels of the captured image near its borders, due to diffraction.

Figure 5:
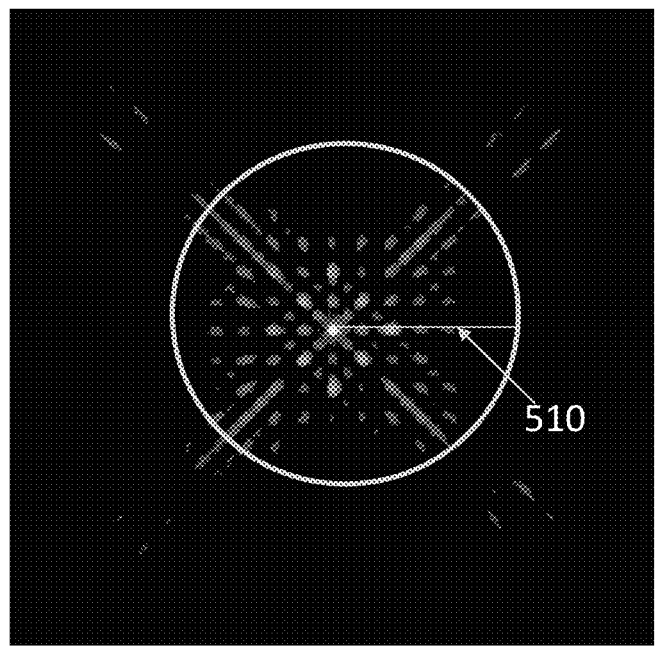
FIG. 5 illustrates an example impact radius.

Once an extended (i.e., padded) image for a particular channel is created, then some portion of the extended image is retained and divided into image patches. In particular embodiments, the width of the extended region may be based on the PSFs for the image. For example, in particular embodiments the width of the extended portion of the image may be set to be equal to or greater than an impact radius of the PSFs at the border of the image. For example, an impact radius may be the radius, starting from the highest-value pixel of the PSF, such that the strength of pixels at and outside the circle defined by the impact radius is below 1/(the dynamic range of sensor) of the peak pixel value of the PSF. For example, FIG. 5 illustrates an example impact radius 510 correspond to a specific PSF. The dynamic range of the sensor in this embodiment is 1024, and therefore the impact radius is defined such that the values of pixels at and outside the circle formed by impact radius 510 are below $1/1024$ of the peak pixel value, which corresponds to the pixel in the center of the PSF. In particular embodiments, the impact radius may be determined empirically and is the same for all PSFs used for a particular optical system. While the examples of FIGS. 4 and 5 illustrate a particular approach for extending an image, this disclosure contemplates that any suitable approach may be used.

Figure 6:
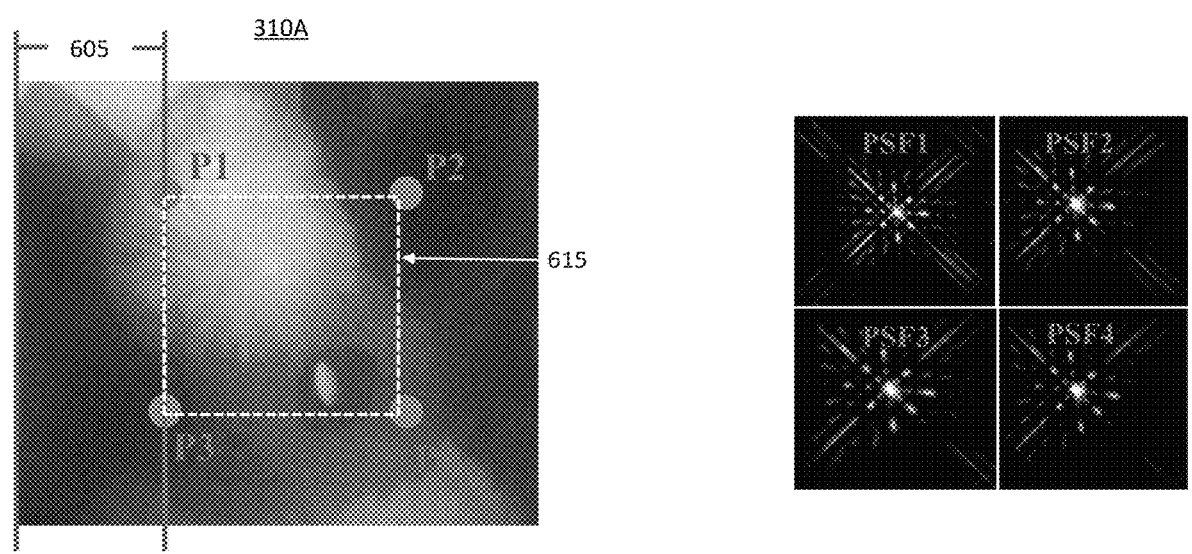
FIG. 6 illustrates an example image patch.

Continuing with the example of procedure 410, once an extended image is obtained, then the extended image is divided into a number image patches. For example, FIG. 3 illustrates example image patches 310A, 310B, and 310C, each defined by locations that correspond to PSFs for the image channel being processed (e.g., the R channel). FIG. 6 illustrates an example image patch corresponding to patch 310A of the example of FIG. 3. In the example of FIG. 6, image patch 310A includes four PSF locations P1, P, P3, and P4, each corresponding to a particular PSF. In the example of FIG. 6, P1 corresponds to PSF1, P2 to PSF2, and so on, and each PSF may be determined by a calibration process or computational process prior to PSF interpolation. Patch 310A includes an interior region defined by boundary 615, which in this example is the region that will be restored by the PSF interpolation, such as the PSF interpolation of the example method of FIG. 2. In other words, for image patch 310A, the region inside boundary 615 will be restored by PSF interpolation, while the portion of patch 310A outside of that region will not be addressed in the deblurring operation for this particular image patch. However, as explained more fully herein, that outside region will be deblurred by different, overlapping image patches. For instance, in the example of FIG. 3, each of points P1, P2, P3, and P4 will be used by four separate image patches, e.g., each will be a top-left corner of an interior region, a top-right corner, a bottom-left corner, and a bottom-right corner, in four separate image patches. In the example of FIG. 6, image patch 310A includes an outer region, of which region 605 is a part, outside of the interior region defined by boundary 615. In particular embodiments, this outer region is included in the image patch because pixel values outside of the interior region contribute to pixel values on and inside boundary region 615.

In particular embodiments, the width of region 605 is defined by the impact radius, which is described above. For instance, in the example of FIG. 6, the width of region 605 may be 50 pixels as a result of the example impact radius described above. While the example of FIG. 6 illustrates a particular shape of an image patch (i.e., a square), a particular shape of an interior region defined by boundary 615 (also a square) and a particular number of PSF locations that will be used for PSF interpolation, this disclosure contemplates that an image patch and the region to be deblurred within the patch may take any suitable shape, and may include two or more PSF locations.

Figure 7:
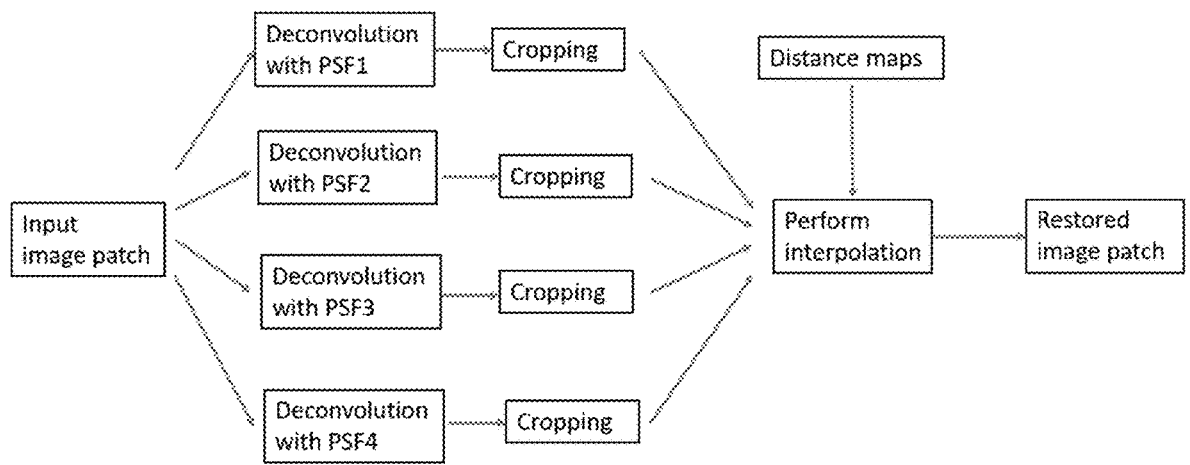
FIG. 7 illustrates an example procedure for deblurring an image patch by interpolating PSFs.
Figure 8:
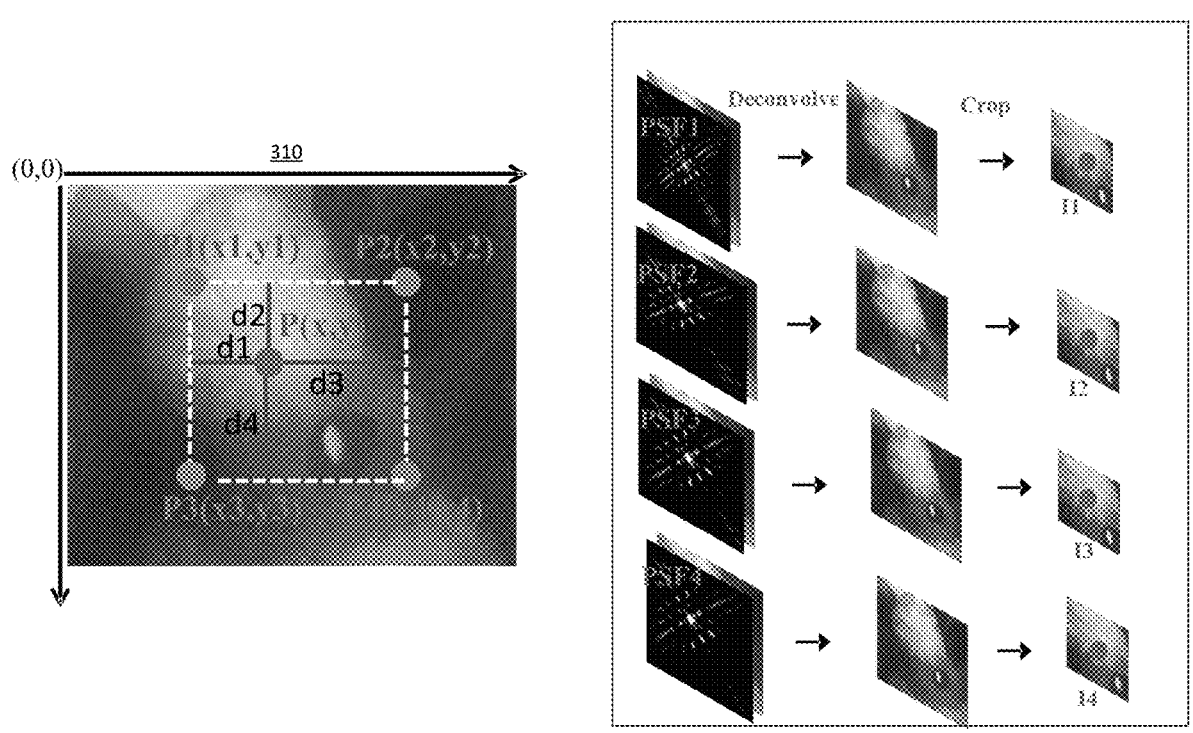
FIG. 8 illustrates an example deconvolution and cropping procedure.

FIG. 7 illustrates an example procedure for deblurring an image patch by interpolating PSFs corresponding to the patch. FIG. 7 illustrates an example of step 220 of FIG. 2, which includes accessing a set PSFs, wherein each PSF in the set of PSFs corresponds to one of a plurality of points in the image patch. In the example of FIG. 6 and FIG. 7, the set of PSFs for image patch 310A includes 4 PSFs, each of which correspond to a particular location in image patch 310A. Step 230 of the example method of FIG. 2 includes, generating a set of deconvolved image patches by deconvolving the image patch with each PSF from the set of PSFs for that patch. FIG. 7 illustrates an example of step 230, in which the input image patch is deconvolved with each of four PSFs within the image patch, e.g., as illustrated in the example of FIG. 6. The deconvolution can be any suitable deconvolution method such as inverse filtering, Hyper-Laplacian deconvolution, Richardson-Lucy deconvolution, etc. As illustrated in FIG. 7, in particular embodiments after deconvolution is performed then the resulting deconvolved image may be cropped, for example to obtain a deconvolved region of interest, such as the region within boundary 615 of the example of FIG. 6. FIG. 8 illustrates an example deconvolution and cropping procedure. As illustrated in FIG. 8, image patch 310A includes a point P that is within the region of interest (i.e., is within boundary 615 as illustrated in FIG. 6). In the example of FIG. 8, image patch 310A is deconvolved with each of the four PSFs within that patch to generate a set of deconvolved image patches. Then, each deconvolved patch is cropped to contain only the region of interest previously discussed. For each deconvolved, cropped image the pixel value at point P is I1, I2, I3, and I4, respectively.

Figure 9:
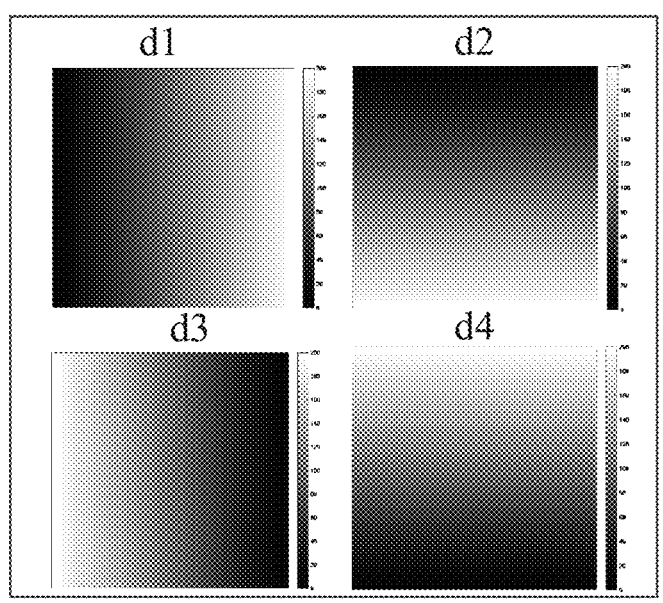
FIG. 9 illustrates four example distance maps.

In the example of FIG. 2, step 240 includes determining, for each of one or more portions of the image patch, a set of weights, wherein each weight in the set of weights is associated with one of the deconvolved image patches. FIGS. 7 and 8 illustrate an example of step 240. FIG. 7 illustrates that after obtaining deconvolved, cropped images, the image patch is restored by interpolating the deconvolved, cropped images. In the example of FIG. 7, the interpolation is performed according to weights obtained from distance maps. FIG. 9 illustrates four distances maps d1, d2, d3, and d4. In particular embodiments, these distances maps may be obtained according to:

$$d1(x,y) = |x - x1|$$

$$d2(x,y) = |y - y1|$$

$$d3(x,y) = |x - x2|$$

$$d4(x,y) = |y - y3|,$$

for x,y points in the patch, as illustrated for example in FIG. 8. This example corresponds to the example discussed above, where the region of interest is a square formed by four PSFs, but this disclosure contemplate that the distance maps may be obtained by any suitable form. For example, if the region of interest was not a square, then the distance map may be obtained by the shortest distance of a point x,y (in Cartesian coordinates, although other coordinate systems may be used) to the boundary of the region of interest, in which case the specific formulas for obtaining the distance map would be different than those identified above.

In particular embodiments, the distance maps may be used to determine the specific weights used to interpolate each point, or pixel, in the region of interest. The interpolation for a particular pixel may be based on the pixel values of each of the deconvolved, cropped image patches. For example, in the example of FIG. 8, the interpolated intensity I of each point P within the region of interest may be given by:

$$I = \frac{d_3 d_4 I_1 + d_1 d_4 I_2 + d_2 d_3 I_3 + d_1 d_2 I_4}{(d_1 + d_3)(d_2 + d_4)}$$

Thus, as illustrated in this example, each portion of the image patch is a pixel, and for each pixel there is a set of weights, determined by the distance maps for that pixel's x,y values, that are used to weight the corresponding intensity values of the deconvolved, cropped images to obtain an interpolated, deconvolved image.

Figure 10:
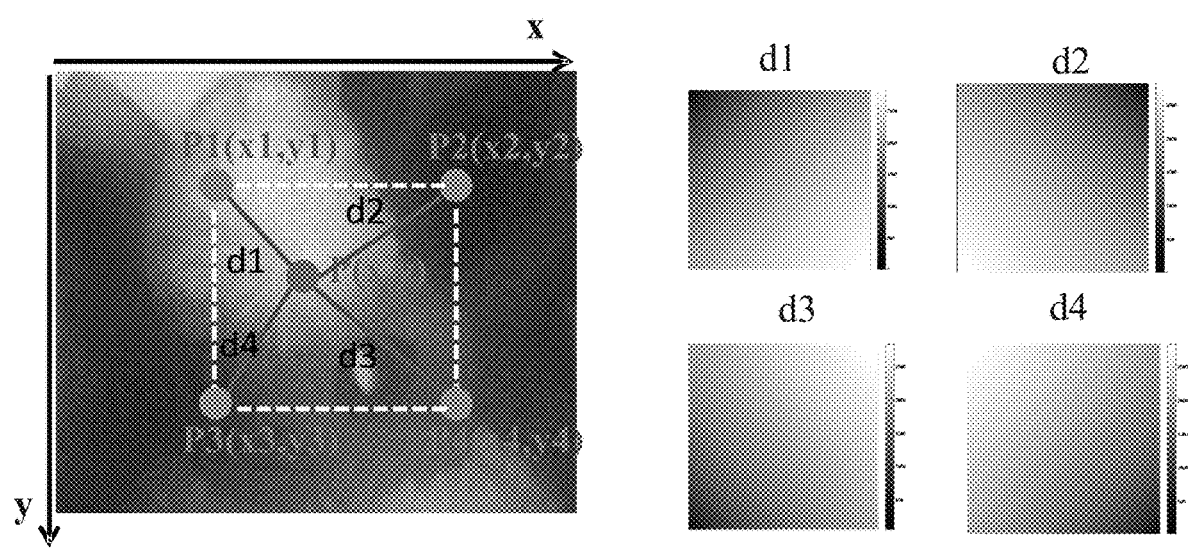
FIG. 10 illustrates another example set of distance maps.

This disclosure contemplates that other approaches may be used to determine the weights for interpolating PSFs for a region of an image patch. For example, rather than the distance of a point P to a boundary of the region of interest, a different approach may calculate distance maps (and the weights used to interpolate a set of PSFs) based on the distance of a point P to the set of PSFs used. For example, FIG. 10 illustrates an example of this approach, in which each distance map is determined according to:

$$d1(x,y) = \sqrt{(x-x1)^2 + (y-y1)^2}$$

$$d2(x,y) = \sqrt{(x-x2)^2 + (y-y2)^2}$$

$$d3(x,y) = \sqrt{(x-x3)^2 + (y-y3)^2}$$

$$d4(x,y) = \sqrt{(x-x4)^2 + (y-y4)^2}$$

Figure 11:
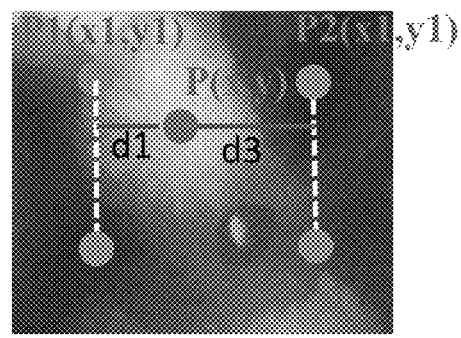
FIG. 11 illustrates an example approach for interpolating PSFs for an image patch.

As another example, interpolation may be based on a subset of the PSFs within an image patch. For example, the interpolation for a point P may be based on the nearest N PSFs for that point. FIG. 11 illustrates an example in which N is 2, and in this example the resulting interpolation I may be made according to:

$$I = \frac{d_3 I_1 + d_1 I_2}{(d_1 + d_3)}$$

The examples discussed above illustrate examples of step 250 of the method of FIG. 2, which includes generating a restored image patch by interpolating the set of deconvolved image patches based on the set of weights. As described above, the restored image patch may be just a portion, such as a region of interest, of the deconvolved image patches used as input. While this disclosure describes specific examples of distance-based weighting and particular examples of interpolation procedures, this disclosure contemplates that any suitable weighting and interpolation techniques may be used to deblur an image according to PSF interpolation.

Figure 12:
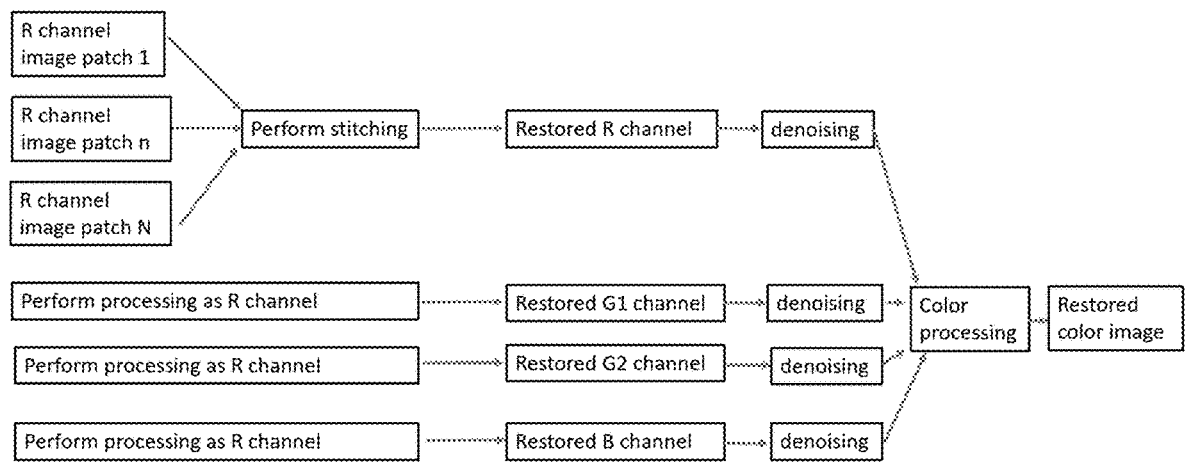
FIG. 12 illustrates an example procedure for obtaining a deblurred image based on PSF interpolation.

FIG. 12 illustrates an example procedure for obtaining a deblurred image based on PSF interpolation. In the example of FIG. 12, for each image patch in the channel, a restored image patch for the region of interest is obtained, e.g., as discussed above with respect to the example of FIG. 7. In particular embodiments, interpolation may be performed for each pixel in the image, for example because the image was extended prior to deblurring. The restored image patches for the channel are then stitched together to obtain a deblurred, restored channel. This process may be repeated for each channel, and each channel may then be denoised and combined together using color processing. In the example of FIG. 12, the final result is a restored, deblurred color image based on deblurring from each of the image channels.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, such as the computer system of FIG. 20, this disclosure contemplates any suitable combination of any suitable components, devices, or systems carrying out any suitable steps of the method of FIG. 2. Moreover, this disclosure contemplates that some or all of the computing operations described herein, including the steps of the example method illustrated in FIG. 2, may be performed by circuitry of a computing device, for example the computing device of FIG. 20, by a processor coupled to non-transitory computer readable storage media, or any suitable combination thereof.

In particular embodiments, PSFs, such as the set of PSFs used above to deblur images using PSF interpolation, are obtained empirically during a calibration phase for a particular optical system. This empirical approach requires performing an experimental measurement of points spread functions at different object points during the calibration stage, which can be a time-consuming and costly process. For example, the exposure time alone required to obtain an HDR representation of each PSF may be upwards of 2 seconds, resulting in many hours of calibration for a single optical system.

Figure 13:
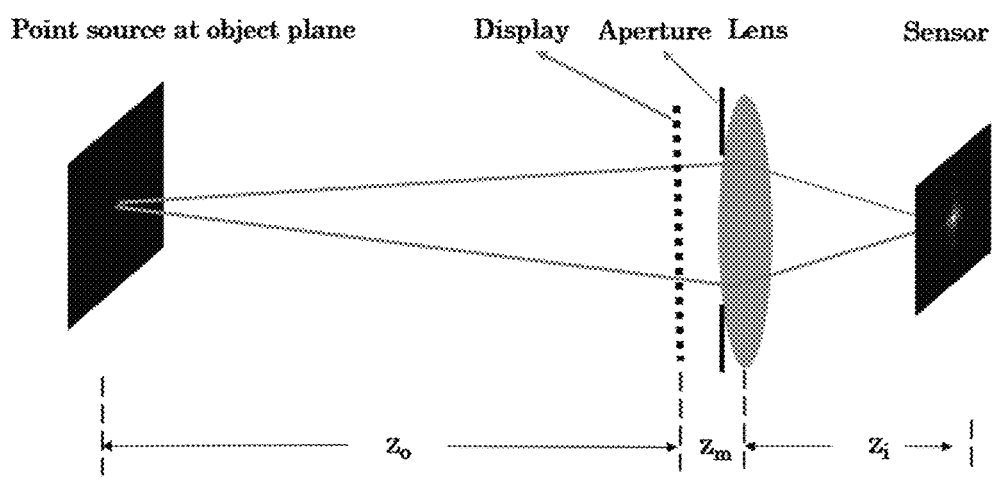
FIG. 13 illustrates an example setup of an optical system that is disposed behind a display of a device.

FIG. 13 illustrates an example setup of an optical system that is disposed behind a display of a device. The system includes an aperture, a lens, and a sensor, but this disclosure contemplates that an optical system may include more or fewer components. A point source at an object plane emits a spherical wave that propagates to the display-mask plane. The light wave will be modulated by the display mask, and the modulated light wave then propagates to the lens plane through the aperture. Then the light wave will converge to the sensor. FIG. 13 illustrates an on-axis point source, but PSFs may also be computed for off-axis point sources.

In particular embodiments, a simulation approach may be used to determine a set of PSFs without having to perform the empirical measurements described above. The simulation emulates the physical process to accurately generate a PSF from any object point.

Figure 14:
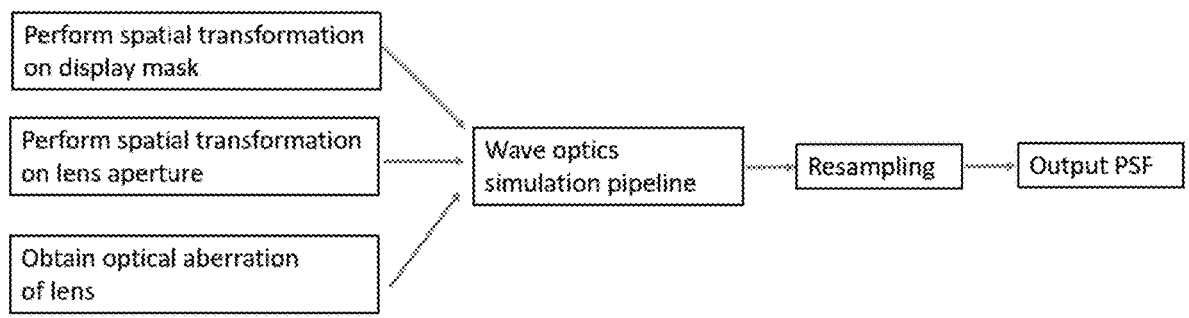
FIG. 14 illustrates an example procedure for simulating one or more PSFs for an optical system.

FIG. 14 illustrates an example procedure for simulating a PSF for an optical system. As illustrated in FIG. 14, the example procedure includes spatial transformations on the components of the optical system, such as the display mask and the lens aperture. Then, the optical aberration of the lens can be obtained, e.g., through lens design tools or through optical testing. A wave optics simulation pipeline may be used to generate a high resolution PSF, which may then be resampled according to sensor pixel size. The end result is the generated PSF.

Figure 15:
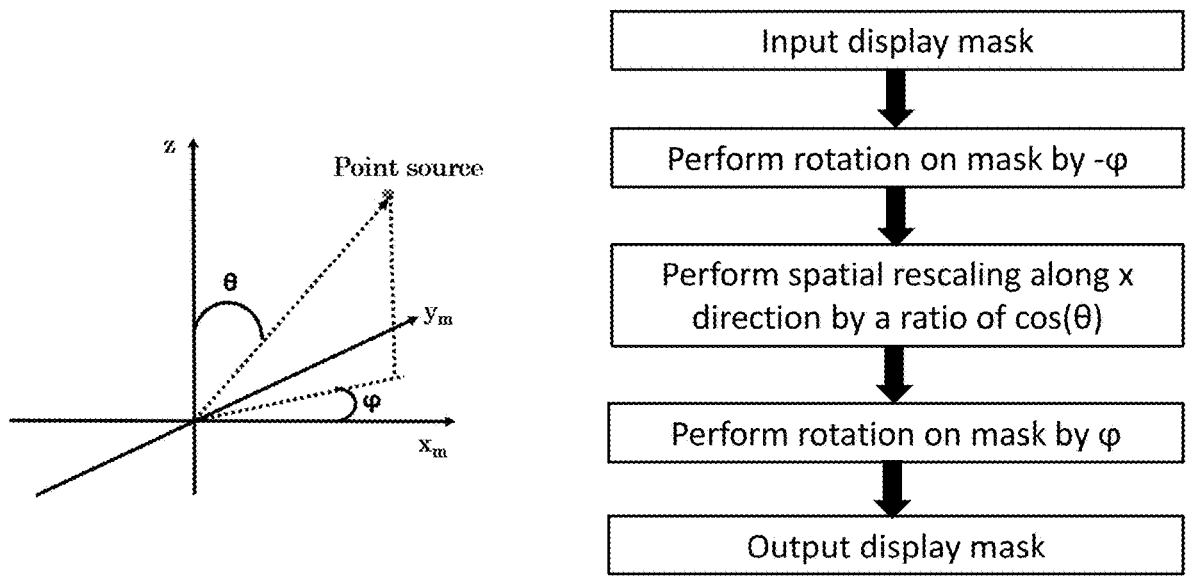
FIG. 15 illustrates an example procedure for performing a spatial transformation of a display mask to determine a PSF at a general point source.
Figure 16:
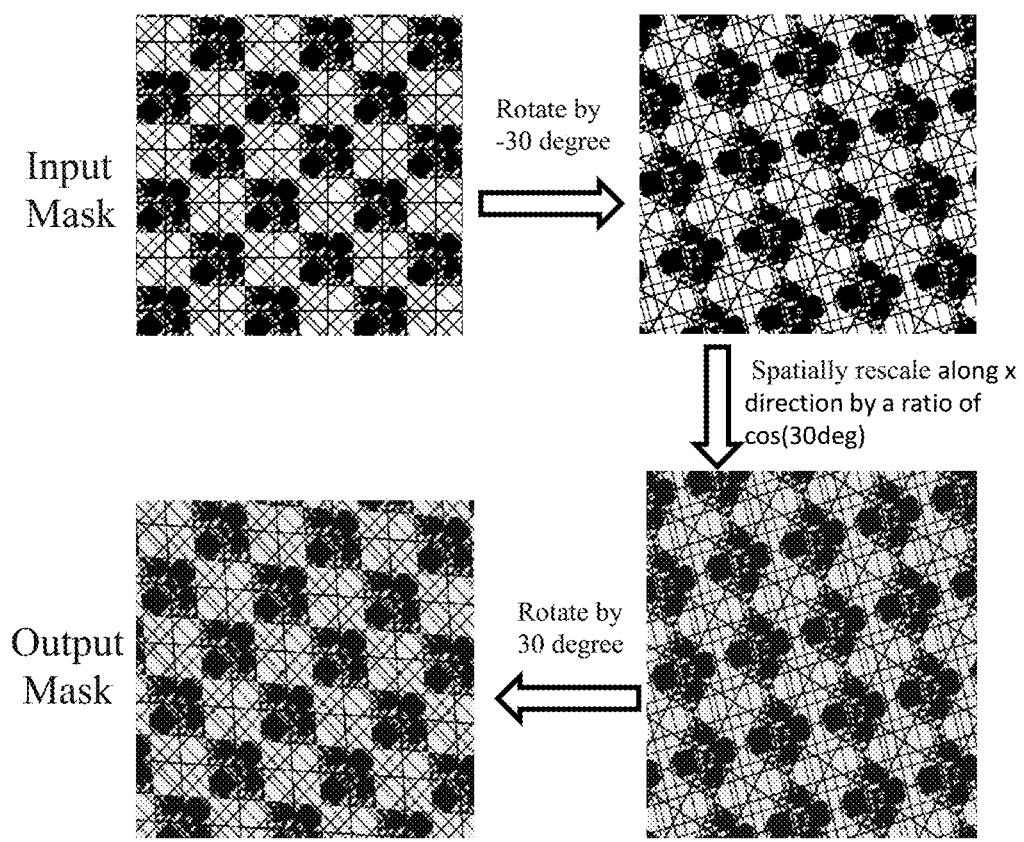
FIG. 16 illustrates an example of a spatial transformation of an input display mask to arrive at an output display mask.

FIG. 15 illustrates an example procedure for performing a spatial transformation of a display mask to determine a PSF at a general point source. In the example of FIG. 15, the object point source is at (θ, φ, z). The input display mask is then rotated by −φ degree or φ degree clockwise. Then the mask is spatially rescaled along the x direction by a ratio of cos(θ). The resultant mask is then rotated by φ degree counterclockwise to obtain the output mask for the point source. FIG. 16 illustrates an example of a spatial transformation of an example input display mask to arrive at an output display mask.

Figure 17:
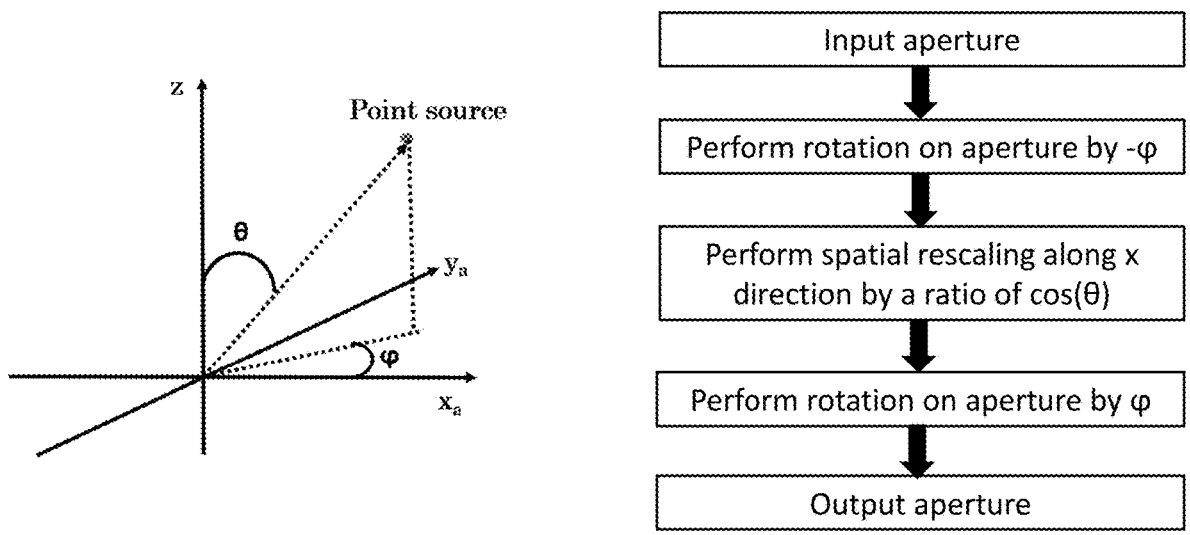
FIG. 17 illustrates an example procedure for performing a spatial transformation of an aperture to determine a PSF at a general point source.
Figure 18:
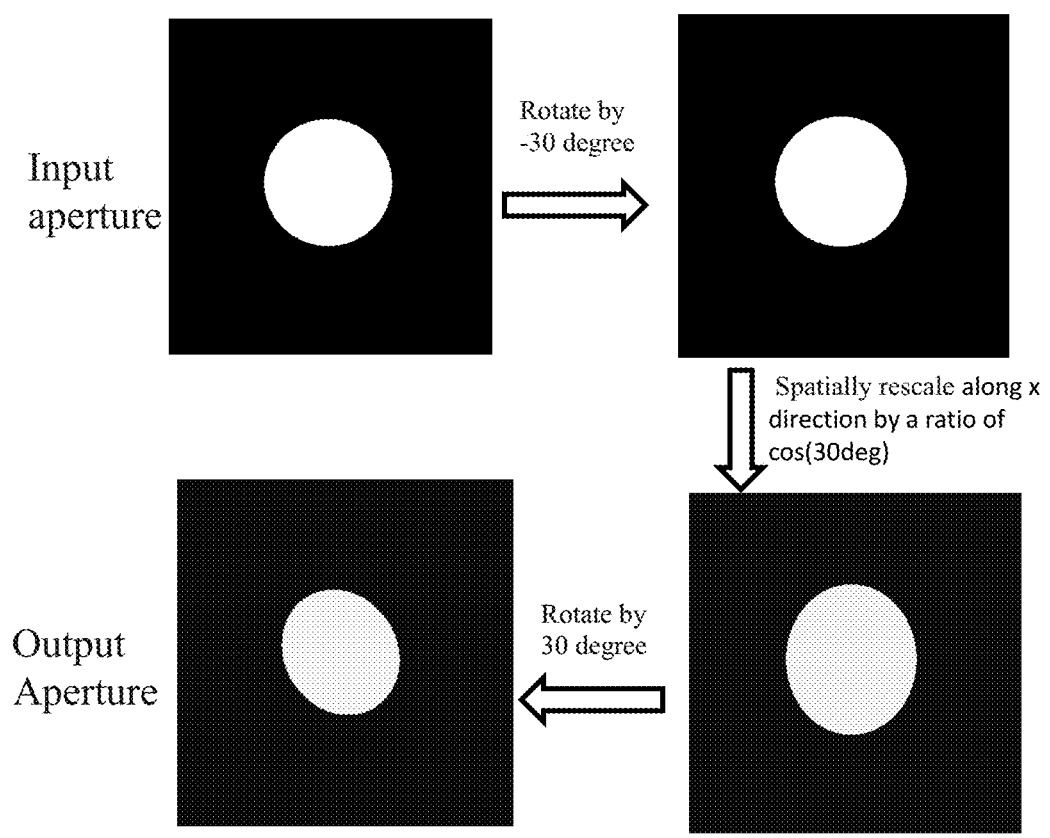
FIG. 18 illustrates an example of a spatial transformation of an input aperture to arrive at an output aperture mask.

FIG. 17 illustrates an example procedure for performing a spatial transformation of an aperture to determine a PSF at a general point source. In the example of FIG. 17, the object point source is at (θ, φ, z). The input display mask is then rotated by −φ degree or φ degree clockwise. Then the mask is spatially rescaled along the x direction by a ratio of cos(θ). The resultant mask is then rotated by φ degree counterclockwise to obtain the output mask for the point source. FIG. 18 illustrates an example of a spatial transformation of an example input aperture to arrive at an output aperture mask.

Figure 19:
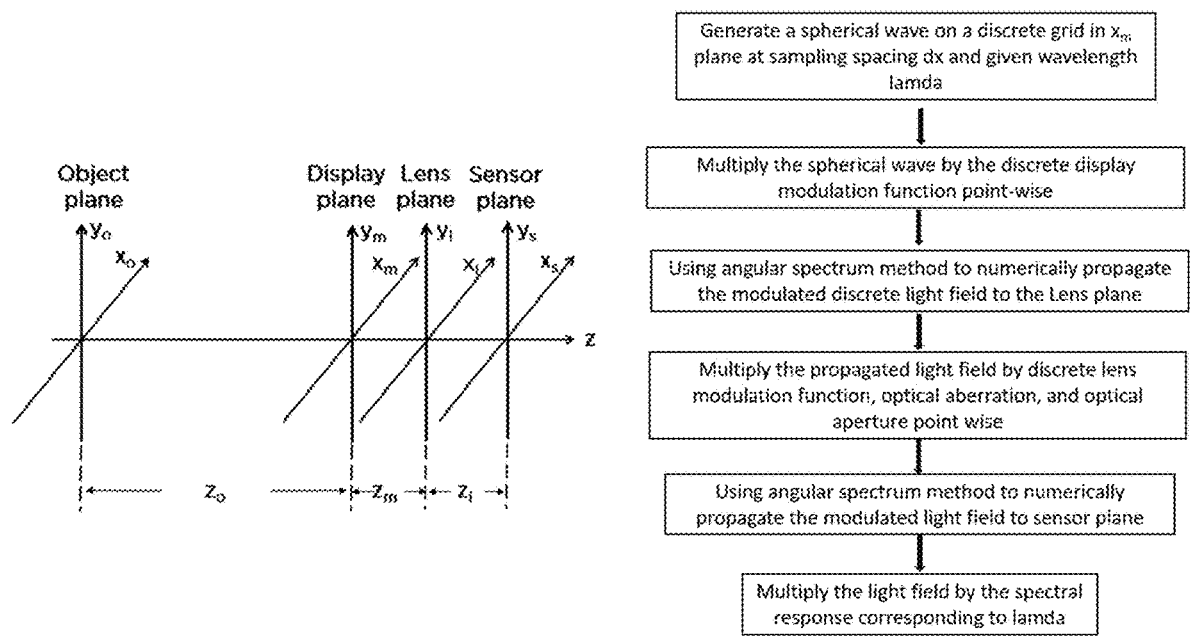
FIG. 19 illustrates an example procedure for determining a PSF using wave-optics simulation.

Once the spatial transformation for the display mask and the aperture are determined, and the optical aberration at the object point is obtained through, e.g., lens design tools or through optical testing, then wave optics can be simulated to obtain a PSF. FIG. 19 illustrates an example procedure for determining a PSF using wave-optics simulation. The procedure of FIG. 19 may be used to numerically compute a PSF at an object point for each sensor channel, such as the R, G, and B channels, using the precomputed display mask, aperture mask, and lens aberration. For a point source at the $x_o$ plane, a discrete spherical wave is generated at display plane and sampled at $dx_m$. In this example, $dx_m$ is set to be 0.5 um. This example uses just one dimension just for simplicity of notation.

As illustrated in FIG. 19, the spherical wave is then modulated by the spatially transformed display mask, as determined above. This modulated light field is then propagated to the lens plane, and computed by the discrete angular spectrum method. A lens function is utilized to modulate the light field. At this step, optical aberration may be added onto the lens function and then the optical aperture will be applied. Finally, the light field as modified in the previous step propagates to the sensor. At each wavelength, the final field will be multiplied by the spectral response to obtain the PSF for that wavelength. PSFs for different wavelengths are then incoherently added together to obtain the PSF for one channel, such as for the R channel. The same procedure is applied to compute PSFs of the remaining sensor channels, such as the G and B channels. For example, the R, G, and B Bayer filters have different spectral responses.

The light field on the mask plane, generated from a point source at $x_o$-$y_o$ plane, can be given by (under paraxial approximation):

$$O_{m0}(x_m, y_m, \lambda) = \frac{O(0,0,\lambda)}{j\lambda z_o} \exp[\frac{j\pi}{\lambda z_o}(x_m^2 + y_m^2)]$$

The light field after being modulated by the mask is given by:

$$O_m(x_m, y_m, \lambda) = \frac{M(x_m, y_m)O(0,0,\lambda)}{j\lambda z_o} \exp[\frac{j\pi}{\lambda z_o}(x_m^2 + y_m^2)]$$

This field will propagate a distance of $z_m$ and pass through a lens at the lens plane. The light field after the lens is given by:

$$O_l(x_l, y_l, \lambda) = \frac{P(x_l, y_l, \lambda)\exp[\frac{-j\pi}{\lambda f}(x_l^2 + y_l^2)]}{j\lambda z_m} \int\int O_m(x_m, y_m, \lambda)\exp\{\frac{j\pi}{\lambda z_m}[(x_l - x_m)^2 + (y_l - y_m)^2]\},$$

where $P(x_l, y_l, \lambda)$ is the optical aperture multiplied by the optical aberration in a pointwise way. The light field at the sensor plane becomes:

$$O_s(x_s, y_s, \lambda) = \frac{1}{j\lambda z_i} \int\int O_l(x_l, y_l, \lambda)\exp\{\frac{j\pi}{\lambda z_i}[(x_s - x_l)^2 + (y_s - y_l)^2]\}$$

The PSF of the imaging system is the intensity response of this point source of the object. It can be computed by:

$$(x_s, y_s, \lambda) = |O_s(x_s, y_s, \lambda)|^2$$

The overall PSF of the imaging system is obtained by incoherent superposition of the PSF of each wavelength, as:

$$h_K(x_s, y_s) = \Sigma[F_K(\lambda)h(x_s, y_s, \lambda)]d\lambda$$

where K means the sensor's R, G, and B channels, for example. F refers to the spectral response. In particular embodiments, all of the above equations will be discretized to perform numerical computation using a computing device.

Figure 20:
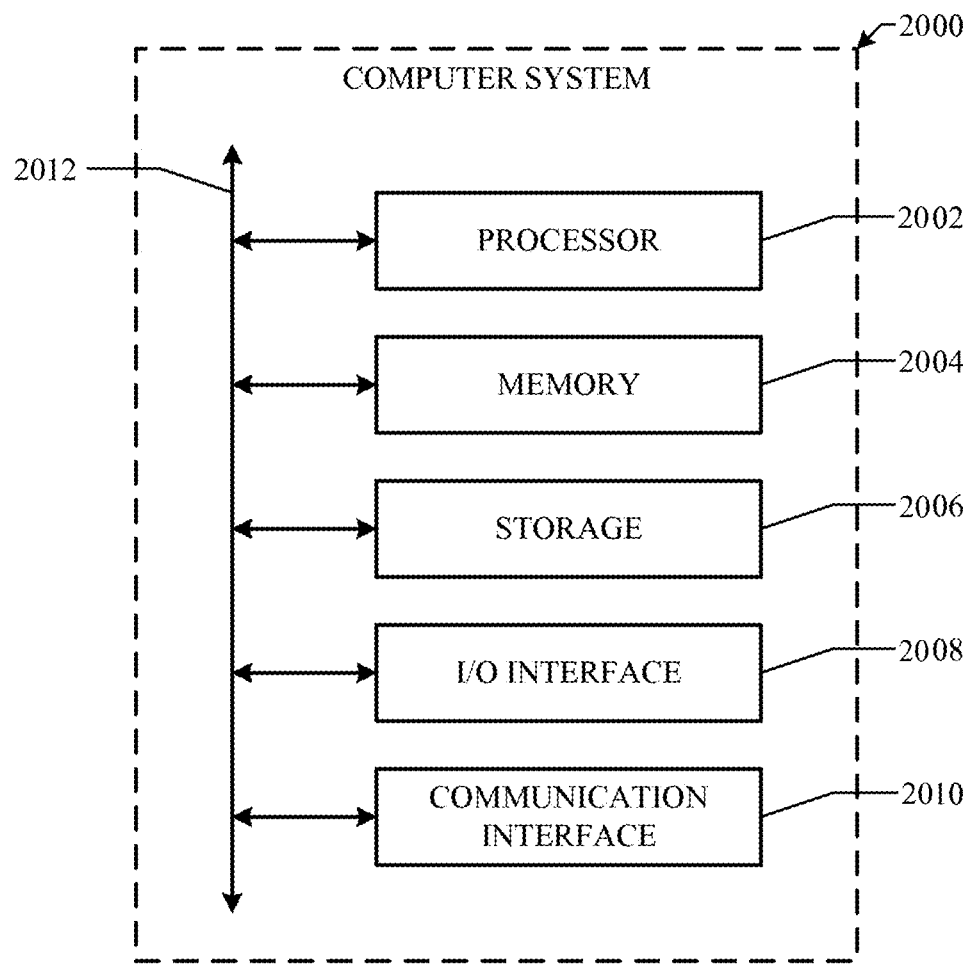
FIG. 20 illustrates an example computer system.

FIG. 20 illustrates an example computer system 2000. In particular embodiments, one or more computer systems 2000 perform one or more steps of one or more methods described or illustrated herein. In particular embodiments, one or more computer systems 2000 provide functionality described or illustrated herein. In particular embodiments, software running on one or more computer systems 2000 performs one or more steps of one or more methods described or illustrated herein or provides functionality described or illustrated herein. Particular embodiments include one or more portions of one or more computer systems 2000. Herein, reference to a computer system may encompass a computing device, and vice versa, where appropriate. Moreover, reference to a computer system may encompass one or more computer systems, where appropriate.

This disclosure contemplates any suitable number of computer systems 2000. This disclosure contemplates computer system 2000 taking any suitable physical form. As example and not by way of limitation, computer system 2000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 2000 may include one or more computer systems 2000; be unitary or distributed; span multiple locations; span multiple machines; span multiple data centers; or reside in a cloud, which may include one or more cloud components in one or more networks. Where appropriate, one or more computer systems 2000 may perform without substantial spatial or temporal limitation one or more steps of one or more methods described or illustrated herein. As an example and not by way of limitation, one or more computer systems 2000 may perform in real time or in batch mode one or more steps of one or more methods described or illustrated herein. One or more computer systems 2000 may perform at different times or at different locations one or more steps of one or more methods described or illustrated herein, where appropriate.

In particular embodiments, computer system 2000 includes a processor 2002, memory 2004, storage 2006, an input/output (I/O) interface 2008, a communication interface 2010, and a bus 2012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2002 includes hardware for executing instructions, such as those making up a computer program. As an example and not by way of limitation, to execute instructions, processor 2002 may retrieve (or fetch) the instructions from an internal register, an internal cache, memory 2004, or storage 2006; decode and execute them; and then write one or more results to an internal register, an internal cache, memory 2004, or storage 2006. In particular embodiments, processor 2002 may include one or more internal caches for data, instructions, or addresses. This disclosure contemplates processor 2002 including any suitable number of any suitable internal caches, where appropriate. As an example and not by way of limitation, processor 2002 may include one or more instruction caches, one or more data caches, and one or more translation lookaside buffers (TLBs). Instructions in the instruction caches may be copies of instructions in memory 2004 or storage 2006, and the instruction caches may speed up retrieval of those instructions by processor 2002. Data in the data caches may be copies of data in memory 2004 or storage 2006 for instructions executing at processor 2002 to operate on; the results of previous instructions executed at processor 2002 for access by subsequent instructions executing at processor 2002 or for writing to memory 2004 or storage 2006; or other suitable data. The data caches may speed up read or write operations by processor 2002. The TLBs may speed up virtual-address translation for processor 2002. In particular embodiments, processor 2002 may include one or more internal registers for data, instructions, or addresses. This disclosure contemplates processor 2002 including any suitable number of any suitable internal registers, where appropriate. Where appropriate, processor 2002 may include one or more arithmetic logic units (ALUs); be a multi-core processor; or include one or more processors 2002. Although this disclosure describes and illustrates a particular processor, this disclosure contemplates any suitable processor.

In particular embodiments, memory 2004 includes main memory for storing instructions for processor 2002 to execute or data for processor 2002 to operate on. As an example and not by way of limitation, computer system 2000 may load instructions from storage 2006 or another source (such as, for example, another computer system 2000) to memory 2004. Processor 2002 may then load the instructions from memory 2004 to an internal register or internal cache. To execute the instructions, processor 2002 may retrieve the instructions from the internal register or internal cache and decode them. During or after execution of the instructions, processor 2002 may write one or more results (which may be intermediate or final results) to the internal register or internal cache. Processor 2002 may then write one or more of those results to memory 2004. In particular embodiments, processor 2002 executes only instructions in one or more internal registers or internal caches or in memory 2004 (as opposed to storage 2006 or elsewhere) and operates only on data in one or more internal registers or internal caches or in memory 2004 (as opposed to storage 2006 or elsewhere). One or more memory buses (which may each include an address bus and a data bus) may couple processor 2002 to memory 2004. Bus 2012 may include one or more memory buses, as described below. In particular embodiments, one or more memory management units (MMUs) reside between processor 2002 and memory 2004 and facilitate accesses to memory 2004 requested by processor 2002. In particular embodiments, memory 2004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2004 may include one or more memories 2004, where appropriate. Although this disclosure describes and illustrates particular memory, this disclosure contemplates any suitable memory.

In particular embodiments, storage 2006 includes mass storage for data or instructions. As an example and not by way of limitation, storage 2006 may include a hard disk drive (HDD), a floppy disk drive, flash memory, an optical disc, a magneto-optical disc, magnetic tape, or a Universal Serial Bus (USB) drive or a combination of two or more of these. Storage 2006 may include removable or non-removable (or fixed) media, where appropriate. Storage 2006 may be internal or external to computer system 2000, where appropriate. In particular embodiments, storage 2006 is non-volatile, solid-state memory. In particular embodiments, storage 2006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2006 taking any suitable physical form. Storage 2006 may include one or more storage control units facilitating communication between processor 2002 and storage 2006, where appropriate. Where appropriate, storage 2006 may include one or more storages 2006. Although this disclosure describes and illustrates particular storage, this disclosure contemplates any suitable storage.

In particular embodiments, I/O interface 2008 includes hardware, software, or both, providing one or more interfaces for communication between computer system 2000 and one or more I/O devices. Computer system 2000 may include one or more of these I/O devices, where appropriate. One or more of these I/O devices may enable communication between a person and computer system 2000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2008 for them. Where appropriate, I/O interface 2008 may include one or more device or software drivers enabling processor 2002 to drive one or more of these I/O devices. I/O interface 2008 may include one or more I/O interfaces 2008, where appropriate. Although this disclosure describes and illustrates a particular I/O interface, this disclosure contemplates any suitable I/O interface.

In particular embodiments, communication interface 2010 includes hardware, software, or both providing one or more interfaces for communication (such as, for example, packet-based communication) between computer system 2000 and one or more other computer systems 2000 or one or more networks. As an example and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2010 for it. As an example and not by way of limitation, computer system 2000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2000 may include any suitable communication interface 2010 for any of these networks, where appropriate. Communication interface 2010 may include one or more communication interfaces 2010, where appropriate. Although this disclosure describes and illustrates a particular communication interface, this disclosure contemplates any suitable communication interface.

In particular embodiments, bus 2012 includes hardware, software, or both coupling components of computer system 2000 to each other. As an example and not by way of limitation, bus 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2012 may include one or more buses 2012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   generating, from an accessed blurred image, a plurality of blurred image patches; and
   for each blurred image patch:
      accessing a set of point-spread functions (PSFs), wherein each PSF in the set of PSFs corresponds to a different one of a plurality of points in the blurred image patch;
      generating, for the blurred image patch, a set of multiple deconvolved image patches, each deconvolved image patch generated by deconvolving the blurred image patch with a different one of the PSFs from the set of PSFs for that blurred image patch;
      determining, for each of one or more portions of the blurred image patch, a set of weights, wherein each weight in the set of weights is associated with a different one of the multiple deconvolved image patches; and
      generating a restored image patch for the blurred image patch by interpolating the set of multiple deconvolved image patches based on the set of weights; and
   generating a deblurred image by replacing each blurred image patch with its corresponding restored image patch and then stitching the image patches together.

2. The method of claim 1, wherein:
   the accessed blurred image comprises a first channelized image, and
   the method further comprises generating the channelized image by:
      accessing a color image; and
      separating the color image into a plurality of channelized images, each channelized image corresponding to a color channel.

3. The method of claim 2, further comprising repeating the method of claim 1 for each of the plurality of channelized images.

4. The method of claim 3, further comprising:
   for each of the plurality of channelized images, generating a restored channelized image based on the plurality of blurred image patches for the blurred image; and
   generating a restored, deblurred color image by combining each of the restored channelized images.

5. The method of claim 1, wherein:
   the accessed blurred image comprises an extended image; and
   the method further comprises generating the extended image by:
      accessing an unextended image; and
      generating the extended image by reflecting at least a portion of the unextended image.

6. The method of claim 1, wherein each blurred image patch includes a region of interest that is smaller than the blurred image patch, and wherein the region of interest comprises the one or more portions of the blurred image patch.

7. The method of claim 1, wherein for each blurred image patch at least some of the PSFs in the set of PSFs for that patch are also in a different set of PSFs for a different, overlapping blurred image patch.

8. The method of claim 1, wherein each of the one or more portions of the blurred image patch comprises a pixel.

9. The method of claim 1, wherein determining the set of weights comprises determining a distance from the portion of the blurred image patch to a boundary that is defined at least in part by the set of PSFs.

10. The method of claim 9, wherein each blurred image patch is a rectangular image patch, and wherein each vertex of the rectangular image patch is a point that corresponds to one of the PSFs in the set of PSFs.

11. The method of claim 9, wherein generating the restored image patch comprises, for each of the one or more portions of the image patch, determining a final output value for that portion according to a rectangular interpolation I.

12. The method of claim 1, wherein:
   the accessed blurred image corresponds to an image captured by a sensor of a computing device that is mounted behind a display of the computing device; and
   each PSF in the set of PSFs deblurs at least some distortion in the image caused by the display.

13. The method of claim 12, wherein at least one PSF in the set of PSFs is determined based on computer simulation.

14. The method of claim 13, further comprising:
   accessing a display mask associated with the display; and
   performing a spatial transformation on the display mask to obtain a transformed display mask.

15. The method of claim 14, further comprising:
   accessing an aperture mask associated with a lens of the sensor; and
   performing a spatial transformation on the aperture mask to obtain a transformed aperture mask.

16. The method of claim 15, further comprising generating the at least one PSF by simulating:
   generating a spherical wave at an object plane;
   generating a light field based on an interaction between the spherical wave and the transformed display mask;
   modifying the light field based on an interaction between the light field and the transformed aperture mask; and
   determining a response of a sensor to the modified light field.

17. One or more non-transitory computer readable storage media embodying instructions and coupled to one or more processors that are operable to execute the instructions to:

generate, from an accessed blurred image, a plurality of blurred image patches; and for each image patch:

access a set of point-spread functions (PSFs), wherein each PSF in the set of PSFs corresponds to a different one of a plurality of points in the blurred image patch;

generate, for the blurred image patch, a set of multiple deconvolved image patches, each deconvolved image patch generated by deconvolving the blurred image patch with a different one of the PSFs from the set of PSFs for that blurred image patch;

determine, for each of one or more portions of the blurred image patch, a set of weights, wherein each weight in the set of weights is associated with a different one of the multiple deconvolved image patches; and generate a restored image patch for the blurred image patch by interpolating the set of multiple deconvolved image patches based on the set of weights.

18. The media of claim 17, wherein determining the set of weights comprises determining a distance from the portion of the blurred image patch to a boundary that is defined at least in part by the set of PSFs.

19. A system comprising one or more processors and a non-transitory computer readable storage media embodying instructions coupled to the one or more processors, the one or more processors operable to execute the instructions to:

generate, from an accessed image, one or more image patches; and for each image patch:

access a set of point-spread functions (PSFs), wherein each PSF in the set of PSFs corresponds to a different one of a plurality of points in the blurred image patch;

generate, for the blurred image patch, a set of multiple deconvolved image patches, each deconvolved image patch generated by deconvolving the blurred image patch with a different one of the PSFs from the set of PSFs for that blurred image patch;

determine, for each of one or more portions of the blurred image patch, a set of weights, wherein each weight in the set of weights is associated with a different one of the multiple deconvolved image patches; and generate a restored image patch for the blurred image patch by interpolating the set of multiple deconvolved image patches based on the set of weights.

20. The system of claim 19, wherein determining the set of weights comprises determining a distance from the portion of the blurred image patch to a boundary that is defined at least in part by the set of PSFs.

* * * * *